(12) United States Patent
Paradie et al.

(10) Patent No.: US 6,522,288 B1  
(45) Date of Patent: Feb. 18, 2003

(54) METHOD AND APPARATUS FOR DETERMINING LOCATION OF OBJECTS BASED ON RANGE READINGS FROM MULTIPLE SENSORS

(75) Inventors: Michael John Paradie, Nashua, NH (US); Andrew Evan Hunt, Wakefield, MA (US); John James Forde, West Roxbury, MA (US)

(73) Assignee: M/A-Com, Inc., Lowell, MA (US)

( * ) Notice: Subject to any disclaimer, the term of this patent is extended or adjusted under 35 U.S.C. 154(b) by 0 days.

(21) Appl. No.: 10/042,903

(22) Filed: Jan. 9, 2002

(51) Int. Cl.$^7$ ................................. G01S 13/08
(52) U.S. Cl. ................. 342/145; 342/70; 342/71; 342/72; 342/146
(58) Field of Search ............... 342/71–72, 70, 342/145–146, 189–192, 435–436

(56) References Cited

U.S. PATENT DOCUMENTS

| | | | | |
|---|---|---|---|---|
| 5,369,409 A | * | 11/1994 | Urabe et al. | 342/128 |
| 5,392,225 A | * | 2/1995 | Ward | 342/189 |
| 6,055,042 A | * | 4/2000 | Sarangapani | 180/167 |
| 6,163,252 A | * | 12/2000 | Nishiwaki | 340/435 |
| 6,396,435 B1 | * | 5/2002 | Fleischhauer et al. | 342/126 |

* cited by examiner

Primary Examiner—Thomas H. Tarcza  
Assistant Examiner—Isam Alsomiri

(57) ABSTRACT

The invention is a method and apparatus for determining the locations of a plurality of actual objects based on the output of a plurality of range sensors. A multiplicity of range measurements are obtained from a plurality of sensors, each sensor capable of providing a multiplicity of range measurements. The range measurements from the plurality of sensors are correlated with each other to generate a list of potential objects and to order that list of potential objects from highest to lowest likelihood of being an actual object. The order may be based upon a cumulative error of the individual sensor measurements upon which the potential object is based. The ordered list of potential objects is then pared down to a smaller list of actual objects by assuming that the potential object highest in the ordered list as an actual object, and then removing from the list all other lower-ordered potential objects that are based on any of the range measurements upon which the selected object is based. The process is repeated for the next highest potential object remaining on the list until all potential objects on the list have either been selected as an actual object or removed from the list.

38 Claims, 5 Drawing Sheets

METHOD AND APPARATUS FOR DETERMINING LOCATION OF OBJECTS BASED ON RANGE READINGS FROM MULTIPLE SENSORS

FIELD OF THE INVENTION

The invention relates to the determination of the locations of multiple objects based on the measurements of multiple sensors. More particularly, the invention relates to determining by trilateration the locations of multiple objects detected by multiple, spaced range sensors.

BACKGROUND OF THE INVENTION

Trilateration is the art of determining the location of an object in space based on knowledge of the range (distance) of the object from multiple known locations. For instance, knowledge of the range of an object from a known location (e.g., one particular sensor) defines a sphere on which the object must lie, that sphere being the sphere that is centered at the sensor and has a radius equal to the measured range value. A range value from two separate locations (sensors) defines two distinct spheres on which the object must lie. Accordingly, the object must lie on the locus of points defined by the intersection of the two spheres, which is a circle. If the range from a third location (or sensor) to the object is known, then the object is known to lie on the locus of points defined by the intersection of all three spheres. For many practical scenarios, the intersection of these three spheres defines a single point which locates the object.

As another example, in a two dimensional environment (or at least an environment that can be assumed to be two dimensional), range readings from only two sensors to the same object will define two circles that intersect at two points. For many practical scenarios, however, only one of these intersections will be located within the detection area of the sensors.

One example of a sensor that provides a range measurement, but no bearing measurement is a broad azimuth radar reflection system. As is well known in the related arts, one can send out a radio frequency (RF) beam from a known location and then receive reflections of that beam at the same (or another known) location and detect the time delay between the time the beam was issued and its reflection back to the sensor. The delay period can be converted to a round-trip distance by multiplying it by the speed of the waves.

Of course, if the radar beam has a defined azimuth, the radar detection system also provides at least some bearing information. Air traffic radar is a well known example of a radar that provides both range and bearing information. Such radars send out very narrow beams from a rotating transmitter antenna. Therefore, range can be determined from the delay of the reflected beam, while bearing can be determined from the angular orientation of the antenna at the time of the receipt of the reflected beam.

In actuality, virtually all radar systems give some bearing information because the transmitters rarely generate totally spherical wave fronts with a full 360° azimuth. For instance, even a radar with an azimuth as wide as 180° eliminates half of the bearing spectrum (assuming one knows the direction in which the sensor is facing).

In theory, when there is a single, point object in the field of view as assumed in the examples discussed above, trilateration is mathematically simple. However, real objects are not point objects. For instance, three sensors detecting the same object may detect slightly different surfaces of the object, wherein each surface is, essentially by definition, at a different location. Further, even in the case of an ideal point object, each sensor has some error range and thus each sensor reading will be inaccurate by some amount. Accordingly, in a real world situation, the three circles defined by the range readings from three different sensor of a single object may not, in fact, intersect at a single point. Rather, there may be three closely spaced intersection points of two circles each, i.e., first and second circles, first and third circles, and second and third circles. Accordingly, various algorithms have been developed for estimating an exact location based on such imperfect readings.

To further complicate matters, in a real world application, there typically will be more than one object in the field of view such that each sensor receives a plurality of reflected wave fronts and, therefore, a plurality of range readings.

Merely as an example, let us consider a highly simplified example in which four sensors each detect ten reflected wave fronts from the same ten actual objects. In this highly simplified example, this means that as many as 10×10×10×10=10,000 "potential objects" will be identified. Let us further assume that we will only consider objects to potentially exist where each of the four sensors has a range reading that defines a circle (or a sphere if a three dimensional system) that intersects a range circle from all three other sensors. It is likely that not all range readings (circles) of each sensor will intersect with the range readings of all three other sensors and, accordingly, with this assumption, it is likely that the number of potential objects will be substantially less than 10,000. However, the number of potential objects still could number in the hundreds in a realistic environment containing ten actual objects. Accordingly, practical trilateration algorithms should include a process for predicting those of the hundreds of potential objects in the field of view that represent actual objects and those that do not (those that correspond to "false objects"). Ideally, such an algorithm should pare down the hundreds of "potential objects" to the ten "actual objects" in the field of view.

Accordingly, it is an object of the present invention to provide an improved multi object location sensor method and apparatus.

It is a further object of the present invention to provide a method and apparatus for eliminating false objects in multi object trilateration.

SUMMARY OF THE INVENTION

The invention is a method and apparatus for determining the locations of a plurality of actual objects using trilateration based on the output of a plurality of range sensors. In accordance with the method and apparatus, a plurality of range measurements are obtained from a plurality of sensors, each sensor capable of providing a multiplicity of range measurements. The range measurements from the plurality of sensors are correlated with each other to generate a list of potential objects. The list of potential objects is then ordered from highest to lowest likelihood of being an actual object, for example, by ordering the objects according to a calculated cumulative error of the individual sensor measurements upon which the potential object is based. The ordered list of potential objects is then pared down to a smaller list of actual objects by selecting the potential object highest on the ordered list and assuming it is an actual object, and then removing from the list all other lower-ordered potential objects that are based on any of the measurements upon which the selected object is based. This process is then repeated for the next highest potential object remaining on the list until all potential objects on the list have either been selected as an actual object or removed from the list.

DETAILED DESCRIPTION OF THE INVENTION

The present invention pertains to a method and apparatus for sensing range to multiple objects using multiple, spaced sensors, and determining the locations of the multiple objects using trilateration. One of the primary problems with such trilateration techniques in complex environments, e.g., environments in which there are multiple objects, complex shaped objects, and/or false readings, is paring down the number of potential objects generated by the basic trilateration step of determining intersecting spheres/circles into a map or list of likely actual objects. For instance, as noted above, in a complex environment in which a sensor receives reflections from multiple objects, the number of potential objects identified can number in the hundreds, when the number of actual objects is less than a dozen.

Accordingly, for trilateration techniques to be of practical use in real world environments, a technique should be implemented to determine which potential objects are likely to be actual objects so that the list of potential objects can be pared down to a reasonably accurate number of actual objects (and their locations).

Trilateration techniques, and particularly trilateration techniques in accordance with the present invention, can be used in many different applications and environments. However, the invention will be described hereinbelow in connection with several different embodiments relating to automotive use. It should be understood by those of skill in the art that this is not a limitation of the invention and is merely an exemplary embodiment. The invention will particularly be described in connection with an embodiment for detecting obstacles in front of a moving car. Such a system might be used in connection with an intelligent stop & go system in which the map of obstacles or objects in front of a vehicle is used to control the speed of the vehicle such as, for instance, matching the speed of a vehicle directly in front of the car when operating in a traffic jam environment.

The discussion thus far has focused on the determination of the location of objects at a given instant in time from the sensor readings. However, in an application such as the aforementioned intelligent stop & go vehicle control system, the track (i.e., direction and velocity) of the detected objects also is determined. In such a system, a multiplicity of temporally displaced sets of readings are taken, each set used to generate a static map of the locations of the objects in the field of view. Then the multiplicity of maps are correlated with one another in order to determine the tracks (or velocity and direction) of the objects.

Figure 1:
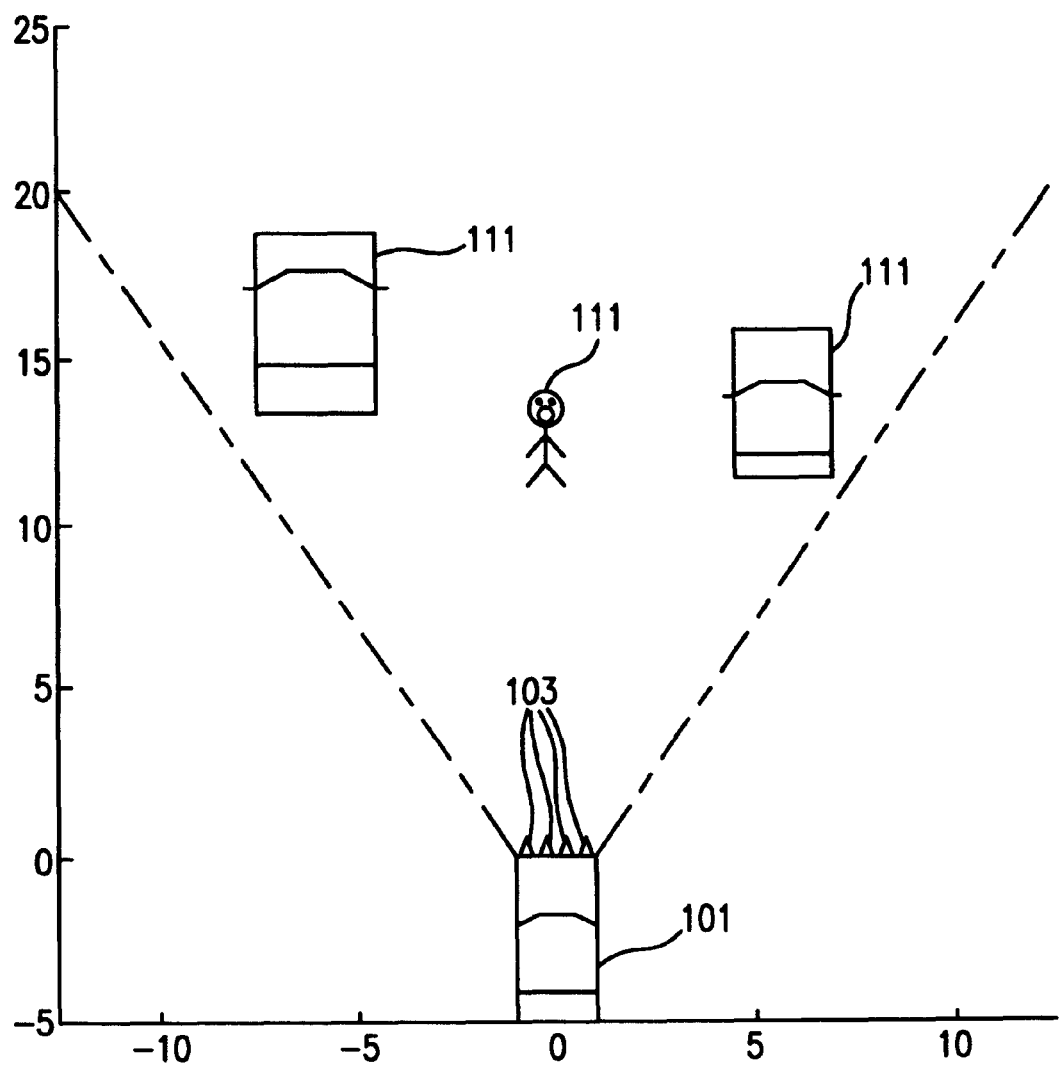
FIG. 1 is a plan view of an automobile having a sensor system in accordance with the present invention.

FIG. 1 is a plan view of an exemplary application of the present invention. In this exemplary application, four radar sensors 103 are positioned in a line in the front end of an automobile 101. The radar sensors may be pulsed or variable frequency sensors so that they can detect and distinguish multiple reflected wave fronts in order to provide range measurements to multiple objects 111.

In at least one preferred embodiment of the invention, each sensor is a short range 24 GHz pulse radar, such as Model MLAU0003-006 manufactured by M/A-COM of Lowell, Mass.

In at least one embodiment, each sensor emits a very short radio frequency (RF) pulse and then detects reflections of that pulse back to the sensor. The sensor determines the delay between the issuance of the pulse and the reflected wave fronts and calculates the distances to the objects off of which the reflected wave pulses reflected. The range of the sensors should be limited to some reasonable distance based on the application. This can be done by discarding any reflected wave fronts below a predetermined magnitude and/or received after a predetermined delay. Alternately or in addition, the number of range measurements can be limited to a particular number, e.g., the ten closest objects (reflected wave fronts). Further, since automobiles are earthbound, in an automotive application it is often reasonable to assume a two dimensional environment without incurring a substantial loss of useful information.

Further, while theoretically as few as two sensors may be used in two dimensional trilateration, it is generally necessary to include more than two sensors. For instance, when the objects may be complex shaped objects, it is quite possible that one or more of the sensors may not detect a reflection off of an object that is within the desired field of view. Further, the use of more than two sensors helps eliminate situations where readings from two different sensors can only reduce the location of the potential location of the object to two possible locations rather than one. The use of more than two sensors provides the means to reduce false objects in accordance with the present invention when range readings from different sensors of different objects are interpreted as a false object. We have found, that, in the automotive field, four sensors arranged in a line in the bumper of an automobile provide good performance.

Figure 2:
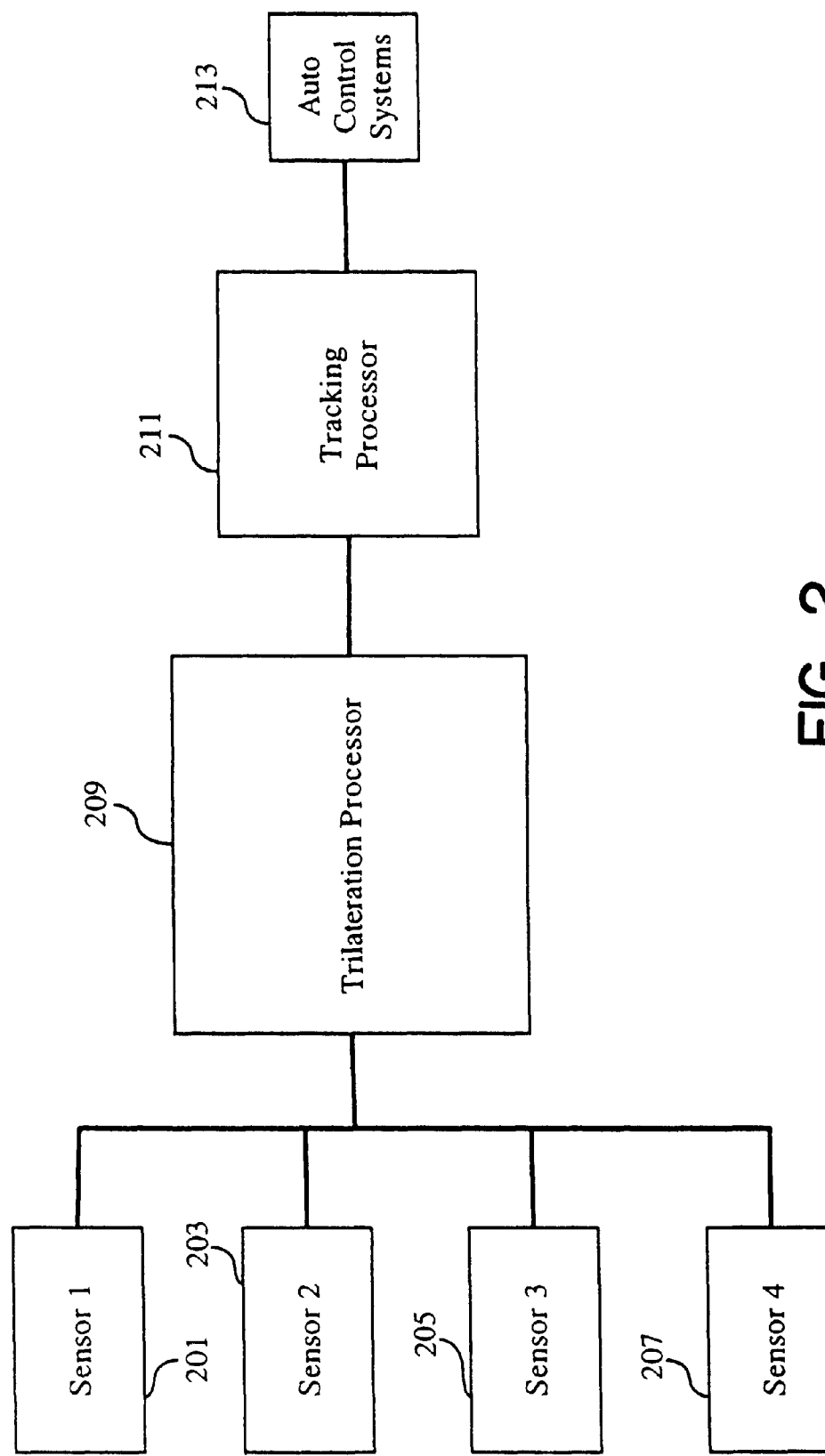
FIG. 2 is a block diagram of an intelligent vehicle control sensor system in accordance with one particular embodiment of the present invention.

FIG. 2 is a block diagram of an intelligent vehicle control system in accordance with the present invention. It comprises four range sensors 201, 203, 205, and 207 and a digital processor 209 coupled to receive the sensors' range measurement outputs. The digital processor 209 takes those measurements, and runs them through an algorithm to create a map of objects in the field of view of the sensors. In a practical stop & go vehicle control system, the processor 209 might output that map to a tracking processor 211 that compares the map to previous maps to track the velocity and direction of the objects and generates signals for controlling other components 213 of the automobile, such as the brakes and accelerator, in order to implement the aforementioned stop & go vehicle control system.

Figure 3:
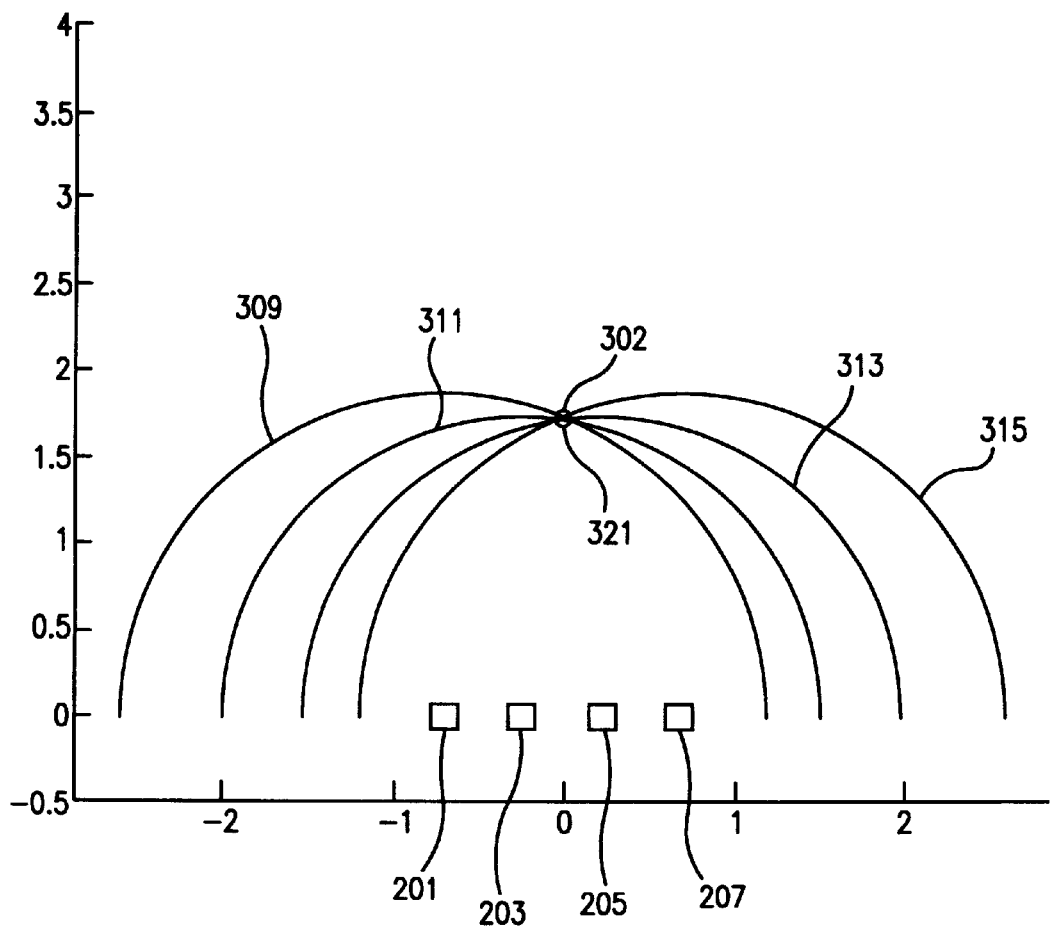
FIG. 3 is a range diagram illustrating range measurements of four sensors to a single idealized point object.

FIG. 3 illustrates a simple simulated scenario involving a single object 302 viewed by a four sensor array. Boxes 201, 203, 205, and 207 indicate the location of the four sensors, respectively. Semicircles 309, 311, 313, and 315 represent the range observation from the four sensors 201, 203, 205, and 207, respectively. The center of each range semicircle is the position of the sensor that generated the observation. In this simple example with one object in the field of view, and assuming no errors and further assuming that the object has one reflection point, all four range semicircles intersect at a single point 321. That point is the location of the detected object 302 with respect to the sensor array.

Figure 4:
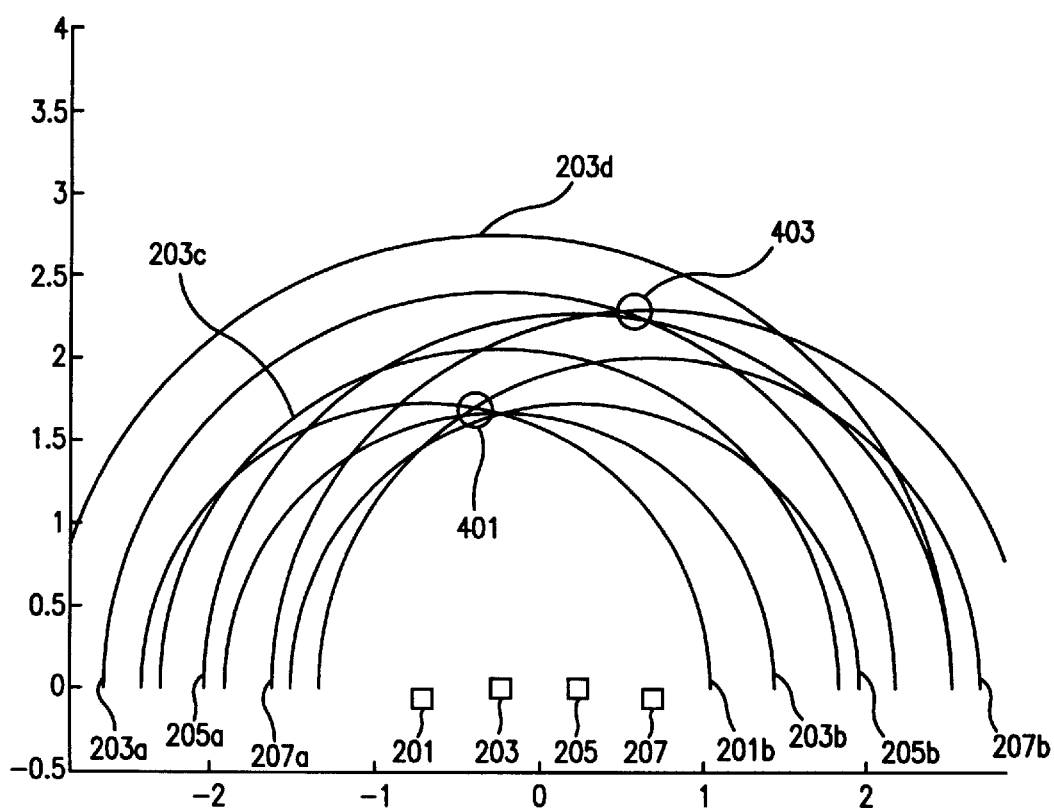
FIG. 4 is a range diagram illustrating range measurements in a second environment.

FIG. 4 represents a more realistic environment encountered by an automobile. However, even the environment depicted in FIG. 4 is rather simplified. In the environment of FIG. 4, the same four sensors 201, 203, 205, and 207 detect two objects, namely, a person 401 and pole 403. Ideally, each of the four sensors 201, 203, 205, and 207 should detect the two objects and only the two objects, i.e., each sensor should generate two accurate range semicircles. However, practically, there is a high probability that one or more of the sensors may (a) not detect one or more of the objects, (b) receive two or more reflections from a single object (particularly if the object is large and/or has a complex shape), and/or (3) simply receive false telemetry. It should be intuitively apparent just from looking at FIG. 4 that there is quite a bit of ambiguity as to which intersections of which circles represent actual objects. It also should be apparent that the exact locations of the objects are made further ambiguous by virtue of the fact that most of the situations where semicircles from three or four different sensors intersect, they do not intersect perfectly at a single point, but over a small area. In short, it is difficult to determine which set of range measurements are observations of the same object.

Accordingly, while the first step of trilateration can generate a map such as the map illustrated in FIGS. 3 and 4, further mathematical manipulation of that data is necessary to make reasonable assumptions about which combinations of range circles of different sensors correspond to actual objects and what is the actual location of that object.

Figure 5:
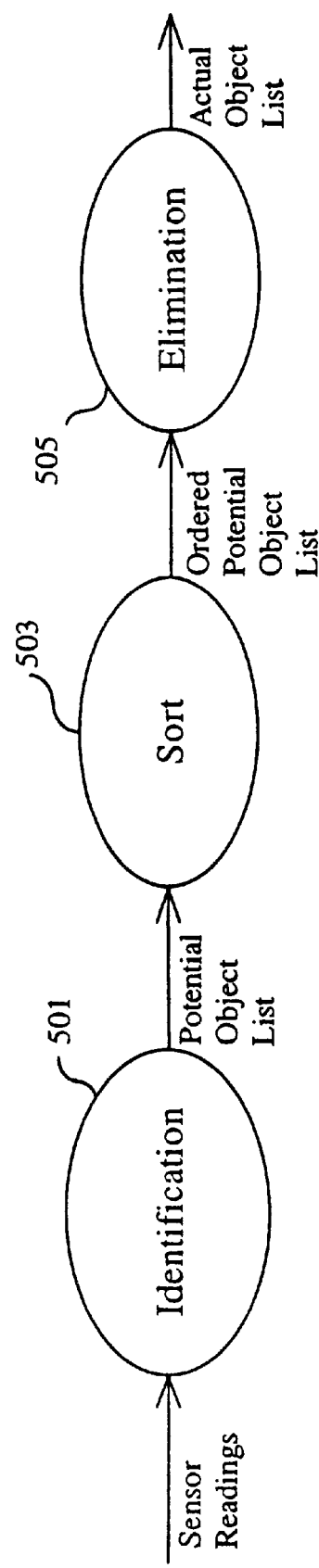
FIG. 5 is a flow diagram illustrating operation in accordance with the one aspect of present invention.

FIG. 5 is a simple flow diagram breaking down a trilateration algorithm in accordance with the present invention that generates a list of actual objects from the sensor range measurements. FIG. 5 basically is a breakdown of the steps that occur in processor 209 of FIG. 2. The first step 501 in the process is parsing through the range measurements of the plurality of sensors to identify which range semicircles might correspond to the same object in order to create a list of potential objects. Certain assumptions usually can be made to simplify this first step. The first reasonable assumption is that all of the range measurements upon which a potential object is based must be from different sensors. Secondly, we can assume that circles from different sensors that do not intersect with each other do not correspond to the same object. Note that both of these assumptions are not necessarily true in all cases. However, in the overall scheme, tend not to lead to significant error.

Thirdly, we will consider potential objects only if they correspond to three or four sensor readings, i.e., we exclude any potential objects that are based on only two sensor readings. In a preferred embodiment of the invention, however, potential objects that are based on only two sensor readings are considered in a distinct algorithm that separately identifies and validates potential objects that are based on only two sensor readings.

As previously noted, with four sensors, each generating ten readings, there is a total of ten thousand possible potential objects. However, generally one must assume that it is possible that one sensor did not receive a reflection from an object that is within the desired field of view. Accordingly, generally one must also consider situations where the range semicircles of only three of the sensors intersect. For instance, if we also consider as potential objects situations where range semicircles of three sensors overlap, the maximum number of potential objects increases to 10,000+1000+1000+1000+1000=14,000. That is, in addition to the 10,000 possible potential objects discussed above for four sensor range intersections, there are four potential combinations of intersecting range semicircles of three sensors, namely, (1) sensors 1, 2, and 3, (2) sensors, 1, 2, and 4, (3) sensors 1, 3, and 4, and (4) sensors, 2, 3, and 4. Since each sensor can generate as many as ten readings, that is 10×10 ×10=1,000 potential objects per each possible combination of three sensors for an additional 4,000 total possible sets of three intersecting range semicircles.

Of course, the numbers discussed above are worst case scenarios. The actual number of combinations of intersecting circles typically will be much lower for several reasons. First, many of the range semicircles will not overlap. Particularly, any two range measurements (or semicircles) from two or more sensors that differ by more than the spacing between the sensors will not intersect. Further, any one or more of the sensors may detect fewer than ten reflected wave fronts.

Accordingly, the number of potential objects generated in this first phase is likely to be substantially less than the potential maximum number, but still could number in the hundreds in a real world situation.

In the first phase, a list of potential objects is generated based on the pertinent range measurements and a location is assigned to each potential object. Several algorithms for estimating location based on range measurements that do not intersect perfectly at a single point are known. Any such suitable algorithm may be employed.

The specific location that is determined for each potential object is a nonlinear problem that can be solved using an iterative least-squares method, such as the Levenberg-Marquardt method. See, for example, William Press et al, "Numerical Recipes in C", Cambridge University Press, 1999. However, we choose a simpler algorithm in order to reduce computational burden. In particular, in a preferred embodiment, the potential object location is calculated using only the range measurement from the two sensors most distant from each other (i.e., the two outermost sensors) of the three or four sensors upon which the potential object is based. Recall that, in a preferred embodiment, for a potential object to even make it on to the list of potential objects, it must be based on intersecting semicircles of three or four different sensors. Thus, in the particular embodiment described herein, the possible existence of an object is based on three or four sensor readings, but the assumed location of that potential object is calculated using only two of those range readings, namely the ones from the outermost sensors, and only these two range readings must intersect.

A Monte-Carlo simulation indicates that the above-described outermost sensor method produces location results the accuracy of which is degraded by less than ten percent compared to the iterative Levenberg-Marquardt algorithm.

The second phase of the trilateration technique of the present invention, illustrated at 503 in FIG. 5, is sorting or ordering the list of potential objects according to a metric that provides a reasonable estimate of the likelihood that the potential object corresponds to an actual object (hereinafter termed a "rank metric"). There are many well-known mathematical algorithms for this purpose. In one preferred embodiment of the invention, a cumulative error for each potential object is calculated. The cumulative error is representative of the difference between the range measurements upon which the particular potential object is based and the assigned location of that potential object as determined in the first step 501. More specifically, one simple, yet effective algorithm for generating a cumulative error is a sum of the squares of the errors (or SSE) algorithm. In this technique, the difference between each range measurement upon which a potential object is based and the assumed range of that potential object from the corresponding sensor (which is easily determined from the assigned location of the potential object in step 501) is determined. Each is then squared. Finally they are summed together.

Note that, depending on the particular embodiment, it may be further necessary to normalize the calculated SSE values with respect to each other. For instance, in an embodiment as discussed herein, in which some potential objects are based on three range readings and some are based on four range readings, the SSE of a potential object that is based on the three readings cannot be compared directly to the SSE of a potential object that is based on the four readings. Thus, the SSE's can be normalized, for instance, by dividing the SSE by the number of sensor readings upon which the potential object is based.

There are many possible variations on the SSE technique. In one preferred embodiment of the invention in which the location of the potential object is determined using only the range measurements from the two outermost sensors as discussed above, the metric is calculated as the sum of the squared errors of the inner sensor range(s) with respect to the location of the potential object. Each square error term is further normalized by dividing by sensor-measurement variance.

In this particular embodiment, the rank metric can be considered to be the sum of one or two random variables, each having zero mean and unity variance. If it is assumed that each variable is also normal and independent, then the ranking metric has a chi-square distribution. Specifically, a three sensor metric has a chi-square distribution with one degree of freedom (from its one inner sensor), whereas a four sensor metric has two degrees of freedom.

It is advantageous for the rank metric of both three and four sensor potential objects to have the same statistical distribution. This would permit these objects to be compared directly to each other using the metric, without bias favoring either kind. To accomplish this, the ranking metric of three sensor objects is mapped to the equivalent chi-square value having two degrees of freedom. The mapping function can be implemented by a polynomial approximation.

Then, the list of potential objects is ordered from lowest metric to highest metric, i.e., from smallest error to largest error. This ordered list essentially is the output of 503.

Elimination is the third and final step of the trilateration algorithm and is illustrated at 505 in FIG. 5. This phase involves paring down the potentially hundreds of potential objects to a much smaller number of actual objects. It should be apparent that this reduction in step 505 is significant. For instance, let us consider an ideal example in which there are three sensors, each accurately detecting only the same five actual objects in the field of view. Let us further assume that all five objects are located such that every combination of ranges from any two sensors intersects. Accordingly, there will be 5×5×5=125 potential objects on the ordered list generated in steps 501 and 503. Ideally, the elimination phase 505 will reduce that list of 125 potential objects down to five actual objects. That is a reduction of 96%.

The elimination algorithm in accordance with the invention is actually quite simple mathematically. First, the highest ranked potential object on the list, e.g., the potential object having the lowest cumulative error, is selected and assumed to be an actual object. Every other potential object on the list having a lower rank and which is based on any one or more of the range measurements upon which the selected object is based is assumed to be a false object and is removed from the potential object list. After all of those objects have been removed, the next highest ranking potential object on the list is assumed to correspond to an actual object. Then, again, every other potential object on the list having a lower rank and which is based on any one or more of the range measurements upon which that selected object was based is also removed from the list. The process continues until all objects on the list have been either selected as an actual object or removed from the list. A The above described trilateration algorithm was applied to the example illustrated in FIG. 4, in which an automobile with four sensors 201. 203, 205, 207 is facing a person 401 and a pole 403. The algorithm identified two objects as shown in the Figure. Accordingly, the algorithm generated a perfectly accurate map of this particular environment. Specifically, it correctly identified point objects at the location of the pole and the person.

The pole 403 in this experiment was a three inch schedule-40 PVC pole. This pole has a small radar cross-section because of its non-metal material. The pole was observed by three sensors 203, 205 and 207, which generated range semicircles 203*a*, 205*a* and 207*a*, but not by the left-most sensor 201. This might have been due to antenna gain considerations. In particular, the left-most sensor 201 has the least antenna gain toward the pole because its look angle is furthest from bore sight of that particular sensor.

The person 401 is the closest point object to the sensor array. A person does not always present a well-defined reflection point to the sensor array. For example, a sensor may detect one leg, the other leg, or the belt buckle. Different sensors may observe different parts of the person. In the FIG. 4 scenario, the person was observed by all four sensors (see range semicircles 201*b*, 203*b*, 205*b*, and 207*b*). However, one sensor 205 reported a slightly short range 205*b* to the person. The trilateration algorithm identified the person 401 as a three-sensor object, and did not associate the fourth sensor range reading 205*b* as belonging to any object.

The second from left sensor 203 generated two false observations: one halfway between the person and the pole 203*c*, and one beyond the pole 203*d*. Sometimes, sensors report false observations. This might occur from electromagnetic interference, multipath interference, or sensor imperfections.

While the invention has heretofore been described primarily in connection in a two dimensional application and using a trilateration technique that assumes that all objects are point objects, these are merely matters of implementation. The invention is readily applicable to three dimensional environments and to other forms of object type assumptions.

A new trilateration algorithm has been developed to locate objects using range data from a high resolution radar sensor array. Further, the algorithm has been demonstrated to properly resolve objects using real world data from a difficult automotive scenario.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

We claim:

1. A method of determining the locations of a plurality of actual objects based on range measurements of a plurality of range sensors, each sensor capable of providing a multiplicity of range measurements, said method comprising the steps of:

(1) obtaining from said sensors a plurality of range measurements;

(2) correlating said range measurements of said plurality of sensors to generate a list of potential objects and their locations, each of said potential objects being based on a plurality of range measurements;

(3) ordering said list of potential objects from highest to lowest likelihood of being an actual object;

(4) selecting a potential object highest on said ordered list as an actual object;

(5) determining the range measurements upon which said potential object selected in step (4) is based;

(6) removing from said ordered list said potential object selected in step (4) as well as any potential objects ordered lower than said potential object selected in step (4) that are based on any of said range measurements upon which said potential object selected in step (4) is based; and (7) repeating steps (4)–(6) until all potential objects have been removed from said list.

2. The method of claim 1 wherein step (3) comprises the steps of:

(3.1) calculating a cumulative error of said range measurements upon which a potential object is based; and (3.2) ordering said list in accordance with said cumulative error calculation.

3. The method of claim 2 wherein step (3.1) comprises the steps of:

(3.1.1) for at least one of said range measurements upon which a potential object is based, determining an error between said at least one range measurement and a range of said sensor that generated said at least one range measurement to said determined location of said potential object;

(3.1.2) squaring each of said errors; and (3.1.3) summing said squared errors.

4. The method of claim 3 wherein said plurality of sensors comprises at least three sensors.

5. The method of claim 4 wherein step (2) comprises the step of excluding from said list any potential objects that are based upon range measurements from less than a predetermined number of sensors.

6. The method of claim 5 wherein step (2) comprises enforcing a rule that no potential object can be based on more than one range measurement from any one sensor.

7. The method of claim 4 wherein said plurality of sensors comprises four sensors.

8. The method of claim 7 wherein step (2) comprises excluding from said list any potential objects that are based upon range measurements from less than three sensors.

9. The method of claim 1 wherein, in step (2), said locations are determined by trilateration.

10. The method of claim 9 wherein step (2) comprises the steps of:

(2.1) for each individual range measurement, determining a locus of points defined by said range measurement;

(2.2) for each said locus of points, determining which of said loci of points corresponding to range measurements from other sensors overlaps said locus of points;

(2.3) putting on said list a potential object corresponding to every locus of points that intersects at least a predetermined number of other loci of points corresponding to range measurements from other sensors.

11. The method of claim 7 wherein step (2) comprises the steps of:

(2.4) for each individual range measurement, determining a locus of points defined by said range measurement;

(2.5) for each said locus of points, determining which of said loci of points corresponding to range measurements from other sensors overlaps said locus of points;

(2.6) putting in said list a potential object corresponding to every locus of points that intersects at least a predetermined number of other loci of points corresponding to range measurements from other sensors.

12. The method of claim 4 wherein step (2) comprises using said range measurements of only the two sensors most distant from each other to generate said locations.

13. The method of claim 12 wherein step (3.1.1) comprises determining said error only for said range measurements upon which said potential object is based other than said two sensors most distant from each other.

14. The method of claim 8 wherein step (2) comprises using said range measurements of only the two sensors most distant from each other to generate said locations.

15. The method of claim 11 further comprising the step of:

(2.7) using said range measurements of only the two sensors most distant from each other to generate said locations.

16. The method of claim 10 wherein said method is performed assuming a two dimensional environment.

17. The method of claim 16 wherein said loci of points comprise circles.

18. The method of claim 8 wherein step (1) comprises limiting a number of range measurements from each sensor to a predetermined number.

19. The method of claim 18 wherein said predetermined number of range measurements from each sensor is ten.

20. A method of determining the locations of a plurality of actual objects based on range measurements from a plurality of range sensors, each sensor capable of outputting a multiplicity of range measurements, said method comprising the steps of:

(1) obtaining from said sensors a plurality of range measurements;

(2) correlating said range measurements of said plurality of sensors to generate a list of potential objects and their locations, each of said potential objects being based on range measurements from a plurality of said sensors;

(3) ordering said list of potential objects from highest to lowest likelihood of being an actual object;

(4) selecting a potential object highest on said ordered list as an actual object;

(5) removing from said ordered list said potential object selected in step (4) as well as any potential objects ordered lower than said potential object selected in step (4) that are based on any of said range measurements upon which said potential object selected in step (4) is based; and (6) repeating steps (4) and (5) until all potential objects have been removed from said list.

21. An apparatus for determining the locations of a plurality of actual objects based on range measurements said apparatus comprising:

a plurality of range sensors, each sensor capable of providing a multiplicity of range measurements;

a digital processor adapted to (a) obtain from said sensors a plurality of range measurements, (b) correlate said range measurements of said plurality of sensors to generate a list of potential objects and their locations, each of said potential objects being based on a plurality of range measurements, (c) order said list of potential objects from highest to lowest likelihood of being an actual object, (d) select a potential object highest on said ordered list as an actual object, (e) determine the range measurements upon which said selected potential object is based, (f) remove from said ordered list said selected potential object as well as any potential objects ordered lower than said selected potential object that are based on any of said range measurements upon which said selected potential object is based, and (g) repeat processes (d)–(f) until all potential objects have been removed from said list.

22. The apparatus of claim 21 wherein, in performing step (c), said digital processor calculates a cumulative error of said range measurements upon which a potential object is based, and orders said list in accordance with said cumulative error calculation.

23. The apparatus of claim 22 wherein said processor calculates said cumulative error by determining for at least one of said range measurements upon which a potential object is based, an error between said at least one range measurement and a range of said sensor that generated said at least one range measurement to said determined location of said potential object, squaring each of said distances, and summing said squared distances.

24. The apparatus of claim 23 wherein said plurality of sensors comprises at least three sensors.

25. The apparatus of claim 24 wherein said digital processor is adapted to include in said list only potential objects that are based upon range measurements from at least a predetermined number of sensors.

26. The apparatus of claim 25 wherein process (b) comprises enforcing a rule that no potential object can be based on more than one range measurement from any one sensor.

27. The apparatus of claim 24 wherein said plurality of sensors comprises four sensors.

28. The apparatus of claim 27 wherein said digital processor is adapted to include in said list only potential objects that are based upon range measurements from it at least three sensors.

29. The apparatus of claim 21 wherein said digital processor determines said locations by trilateration.

30. The apparatus of claim 25 wherein said digital processor uses said range measurements of only the two sensors most distant from each other to generate said locations.

31. The apparatus of claim 30 wherein said process calculates said cumulative error using only said range measurements upon which said potential object is based other than said two sensors most distant from each other.

32. The apparatus of claim 29 wherein said digital processor is adapted to assume a two dimensional environment.

33. The apparatus of claim 28 wherein each of said sensors generate no more than a predetermined number of range measurements.

34. The apparatus of claim 33 wherein said predetermined number of range measurements is ten.

35. The apparatus of claim 27 wherein said sensors are arranged in a line.

36. An automobile comprising said apparatus of claim 21.

37. The automobile of claim 36 further comprising:

a processor adapted to determine tracks of said selected objects based on a plurality of temporally spaced multiplicity of range measurements.

38. The automobile of claim 37 further comprising:

a processor for controlling the velocity of said automobile based on said tracks.

* * * * *